United States Patent [19]

Staendeke et al.

[11] Patent Number: 4,514,328
[45] Date of Patent: Apr. 30, 1985

[54] PARTICULATE MATERIAL REDUCING THE IGNITABILITY OF COMBUSTIBLE SUBSTANCES

[75] Inventors: Horst Staendeke, Lohmar; Franz-Josef Dany; Joachim Kandler, both of Erftstadt, all of Fed. Rep. of Germany

[73] Assignee: Hoechst Aktiengesellschaft, Fed. Rep. of Germany

[21] Appl. No.: 485,291

[22] Filed: Apr. 15, 1983

[30] Foreign Application Priority Data

May 12, 1982 [DE] Fed. Rep. of Germany ....... 3217816

[51] Int. Cl.³ .......................... C08K 3/28; C08K 3/32
[52] U.S. Cl. ..................... 252/609; 252/606; 428/921; 521/106; 521/906; 524/416
[58] Field of Search ........................ 252/606, 609, 601; 524/416; 521/85, 106, 906, 907; 428/921

[56] References Cited

U.S. PATENT DOCUMENTS

| | | | |
|---|---|---|---|
| 3,423,343 | 1/1969 | Barnett | 521/106 |
| 3,423,344 | 1/1969 | Odinak et al. | 521/106 |
| 3,723,074 | 3/1973 | Sears et al. | 252/601 |
| 4,129,693 | 12/1978 | Cenker et al. | 521/106 |
| 4,196,005 | 4/1980 | Morgan et al. | 252/601 |
| 4,202,779 | 5/1980 | Smith et al. | 252/609 |
| 4,252,857 | 2/1981 | Heine et al. | 252/601 |
| 4,260,514 | 4/1981 | Foucht | 252/609 |
| 4,347,334 | 8/1982 | Staendeke et al. | 524/416 |
| 4,381,351 | 4/1983 | Szabat | 521/107 |
| 4,385,131 | 5/1983 | Fracalossi et al. | 521/55 |

*Primary Examiner*—Stephen J. Lechert, Jr.
*Assistant Examiner*—Howard J. Locker
*Attorney, Agent, or Firm*—Connolly and Hutz

[57] ABSTRACT

The disclosure relates to a particulate agent based on free-flowing, pulverulent ammonium polyphosphate of the general formula $$H_{(n-M)+2}(NH_4)_m P_n O_{3n+1}$$

in which n stands for a whole number with an average value of about 20 to 800 and the ratio of m/n is about 1. The agent reduces the ignitability of combustible substances and constists of (a) about 80 to 99.5 mass % ammonium polyphosphate and
(b) about 0.5 to 20 mass % hardened epoxide resin having an epoxide equivalent weight of about 170 to about 220, the epoxide resin enveloping the individual ammonium polyphosphate particles.

6 Claims, 1 Drawing Figure

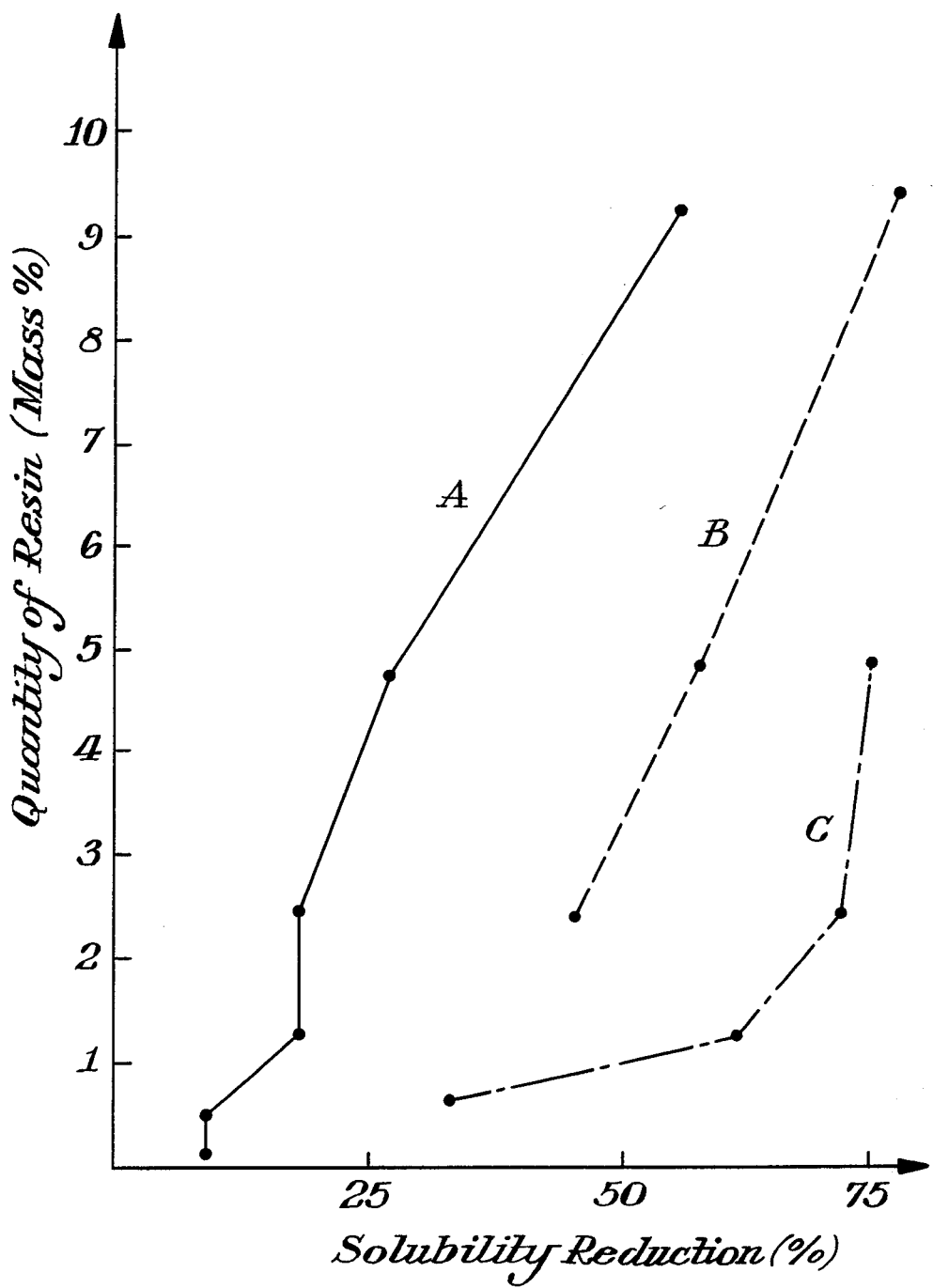

PARTICULATE MATERIAL REDUCING THE IGNITABILITY OF COMBUSTIBLE SUBSTANCES

The present invention relates to a particulate agent based on free-flowing, pulverulent ammonium polyphosphates for reducing the ignitability of combustible substances.

It is generally accepted that ammonium polyphosphates can be used as agents for flameproofing plastics. German Patent Specification DE-AS No. 12 83 532, for example, describes a process for making flame-retardant polyurethanes from high molecular weight polyhydroxyl compounds, polyisocyanates and catalysts, an ammonium polyphosphate of the general formula $$H_{(n-m)+2}(NH_4)_m P_n O_{3n+1}$$

in which n stands for a whole number with an average value of more than 10, m stands for a whole number of at most $n+2$, and the ratio of m/n is between about 0.7 and 1.1, being used as a flame-retardant addend.

Although ammonium polyphosphates of the above general formula permit good flameproofing properties to be conferred upon polyurethanes, the fact remains that they are not fully satisfactory inasmuch as they are insufficiently water-insoluble and therefore liable to be washed out from the plastics with the passage of time under outdoor conditions. As results from the statements made in column 3 of DE-AS No. 12 83 532, the ammonium polyphosphates are said to be practically water-insoluble; actually, however they still have a considerable solubility in water; on suspending 10 g of the ammonium polyphosphate in 100 cm³ water at 25° C., up to 5 g of the polyphosphate is dissolved, i.e. the ammonium polyphosphate has up to 50% soluble matter contained in it.

In the production of self-extinguishing compliant polyurethane foam plastics, e.g. by the process disclosed in German Patent DE-AS No. 23 13 819 by subjecting a polyester-polyol having a trimethylpropane incorporated therewith to polycondensation with an organic polyisocyanate in the presence of at least 10 parts by weight ammonium polyphosphate, based on 100 parts by weight polyol, it is usually a special problem to homogenize the feed mixture because of its viscosity. In the presence of 30 weight % ammonium polyphosphate having a condensation degree n of about 700, the batch has a viscosity of about 70 000 mPa.s, and is therefore very difficult to mix or knead; a polyesterpolyol based on adipic acid, diethylene glycol and a triol as commonly used in practice already has a viscosity of more than 20 000 mPa.s at 25° C. It has therefore been necessary heretofore to use an ammonium polyphosphate with a condensation degree n of less than 400 which however is more readily water-soluble than high-condensed phosphates and therefore liable to become partially washed out from the foam plastics under outdoor conditions.

In other words, it is highly desirable to have an agent and process permitting the solubility of ammonium polyphosphates in water to be so reduced that the ammonium polyphosphate as a flame-proofing agent for plastics is substantially not liable to be washed out under outdoor conditions. In addition to this, it is desirable for the ammonium polsphosphate addend as slightly as possible to increase the viscosity of an already viscous polyester-polyol batch.

Attempts have already been made to achieve this goal in German Patent Specification DE-OS Nos. 29 49 537 and 30 05 252, respectively, which provide for the ammonium polyphosphate particles to be treated with, and envelopped in, a melamine resin and/or hardened phenol resin.

We have now unexpectedly found that the substitution in accordance with this invention of an epoxide resin for melamine and/or phenol resins entails certain advantageous effects.

The present invention provides more specifically a particulate agent based on free-flowing pulverulent ammonium polyphosphates of the general formula $$H_{(n-m)+2}(NH_4)_m P_n O_{3n+1}$$

in which n stands for a whole number with an average value of about 20 to 800 and the ratio of m/n is about 1, for reducing the ignitability of combustible substances, the agent conisting of (a) about 80 to 99.5 mass % ammonium polyphosphate and (b) about 0.5 to 20 mass % hardened epoxide resin having an epoxide equivalent weight of about 170 to about 220, the epoxide resin enveloping the individual ammonium polyphosphate particles.

The agent of this invention generally consists of particles having a means size of about 0.01 to 0.05 mm and the degree of condensation n of the ammonium polyphosphate preferably stands for a whole number having an average value of 450 to 800, determined by the terminal group titration process (cf. van Wazer, Griffiter and McCullough, Anal. Chem. 26, page 1755 (1954)).

A preferred feature of the invention provides for the agent to contain the epoxide in a proportion of 1 to 5 mass %.

The epoxide resin chiefly is an alcohol-soluble hardenable resin which is obtained by reacting a dihydric or polyhydric alcohol with epichlorhydrin or glycerol dichlorohydrin under alkaline conditions or, if desired, in the presence of an acid catalyst and then treating it with an alkali.

The invention finally relates to the use of the agent for flameproofing polyurethanes or polyurethane foam plastics, the polyurethane foam plastics containing the agent in a proportion of about 5 to 25 mass %, based on the quantity of polyol component in the polyurethane.

It is possible for the epoxide resins to be applied to the ammonium polyphosphate particles either in the form of an alcoholic resin olution by hardening the resin with the aid of a hardener and while stirring the ammonium polyphosphate/resin-suspension, or by evaporating the solvent from the suspension in a heated kneader while hardening the resin.

By enveloping the ammonium polyphosphate particles with a hardened epoxide resin in accordance with this invention, the solubility of the ammonium polyphosphate in water is considerably reduced and this has technically beneficial effects e.g. as regards its use as a flameproofing agent for polyurethane foam plastics.

In addition to this, the present flameproofing agent does not adversely affect, i.e. increase, the viscosity of the feed mixture used for making polyurethane foam plastics so that the feed mixture remains readily processable.

The epoxide resins compare favorably with the enveloping resins used heretofore, such as phenol or melamine resins. More specifically, they permit the water-solubility and viscosity in an aqueous medium to be more effectively reduced than heretofore.

The present agents, their preparation and typical advantages are described in greater detail in the following Examples. The tests described in the Examples were made with the use of commercially available ammonium polyphosphates and with the use of various, likewise commercially available epoxide resin systems. More particularly, the following products are concerned:

1. EXOLIT 263 (this is a registered Trade Mark of Hoechst AG, Frankfurt/Main, Federal Republic of Germany) This is fine particulate, scarcely water-soluble ammonium polyphosphate of the formula $(NH_4PO_3)_n$, where n is about 700.

2. EXOLIT 422 (this is a registered Trade Mark of Hoechst AG, Frankfurt/Main, Federal Republic of Germany) This is fine particulate, scarcely water-soluble ammonium polyphosphate having a condensation degree n of about 700.

3. BECKOPOX EP 128 (this is a registered Trade Mark of Hoechst AG, Frankfurt/Main, Federal Republic of Germany) This is a liquid epoxide resin of very low viscosity, having an epoxide equivalent weight of about 200, a density of 1.12 g/ml at 25° C., and a dynamic viscosity of 500–1000 mPa.s at 25° C.

4. BECKOPOX VEH 2130 (this is a registered Trade Mark of Hoechst AG, Frankfurt/Main, Federal Republic of Germany) This is a modified aliphatic polyamine hardener which has an H-equivalent weight of about 200, a density of 1.10 g/ml at 25° C., and a dynamic viscosity of about 12 000 mPa.s at 25° C.

5. BECKOPOX VEP 22 (this is a registered Trade Mark of Hoechst AG, Frankfurt/Main, Federal Republic of Germany) This is a liquid epoxide resin of very low viscosity, having an epoxide equivalent weight of about 195, a density of 1.11 g/ml at 25° C., and a dynamic viscosity of 650 to 700 mPa.s at 25° C.

6. BECKOPOX EP 140 (this is a registered Trade Mark of Hoechst AG, Frankfurt/Main, Federal Republic of Germany) This is a liquid epoxide resin of means viscosity, having an epoxide equivalent weight of about 190, a density of about 1.16 g/ml at 25° C., and a dynamic viscosity of 9000–12 000 mPa.s at 25° C.

7. BECKOPOX EH 643 (this is a registered Trade Mark of Hoechst AG, Frankfurt/Main, Federal Republic of Germany) This is a solvent-free epoxide resin hardener based on polyamine, having an H-active equivalent weight of 55 and a dynamic viscosity of 7000–10 000 mPa.s at 25° C.

8. BECKOPOX EH 641 (this is a registered Trade Mark of Hoechst AG, Frankfurt/Main, Federal Republic of Germany) This is a solvent-free epoxide resin hardener based on polyamine, having an H-active equivalent weight of 114 and a dynamic viscosity of 200–300 mPa.s at 25° C.

9. DESMOPHEN 2200 (this is a registered trade Mark of Bayer AG, Leverkusen, Federal Republic of Germany) This is a slightly branched polyester based on adipic acid, diethylene glycol and a triol; it has a hydroxyl number of 60 mg KOH/g, a viscosity of 1000 mPa.s at 75° C., a density of 1.18 g/ml at 20° C., and contains less than 0.1 mass % water. DESMOPHENE 2200 is used for making polyurethane foam plastics on polyester basis.

EXAMPLE 1

150 g ammonium polyphosphate (EXOLIT 263) was suspended in 600 ml methanol in a stirring apparatus made of glass, and the suspension was heated to gentle boiling. Next, a methanolic epoxide resin/epoxide resin hardener-solution which was prepared by dissolving 3 g BECKOPOX EP 128 and 3 g BECKOPOX VEH 2130 in 100 ml methanol was added dropwise within 15 minutes. For hardening the epoxide resin, the suspension was stirred for 2 hours while the methanol boiled gently. After cooling, the whole was filtered and the resulting filter cake was dried at 110° C. in a stream of nitrogen. 154 g treated ammonium polyphosphate which contained 3.5 mass % epoxide resin was obtained.

This product was tested for its influence on the viscosity of DESMOPHEN 2200; to this end, 30 g of the product was stirred into 70 g DESMOPHEN 2200 and the whole was tempered for about 1 hour at 25° C. Next the viscosity of the mixture was determined using a Brookfield viscosimeter RVT, spindle C at 5 rpm per minute. The result obtained is indicated in Table 1.

To determine the water-soluble constituents, 10 g of the product was suspended in 100 ml water and the suspension was stirred for 20 minutes at 25° C. Next, the product portion not dissolved in water was caused to deposit by centrifugation within 40 minutes. 5.0 ml clear supernatant solution was pipetted into a previously weighed aluminum dish and evaporated at 120° C. in a drying cabinet. The water-soluble portion was calculated from the quantity of evaporation residue. The result obtained is indicated in Table 1.

EXAMPLE 2

The procedure was as in Example 1 but a solution of 3 g BECKOPOX VEP 22 and 3 g BECKOPOX VEH 2130 in 100 ml methanol was used. 152 g treated ammonium polyphosphate, termed APP hereinafter, which contained 3.6 mass % epoxide resin was obtained.

The values for viscosity and water-soluble constituents was determined as described in Example 1 and are indicated in Table 1.

EXAMPLE 3

200 g APP (EXOLIT 263) was weighed into a 1 liter flask of a laboratory rotating evaporator and the APP was admixed with a solution of 1.55 g BECKOPOX EP 140 and 0.45 g BECKOPOX EH 643 in 140 ml methanol. Under slight underpressure of about 0.95 bar, the whole was hardened over 1 hour at about 60° C. and the methanol was distilled off under reduced pressure of about 0.85 bar. The product was dried at 110° C. under a pressure of 0.1 bar. 200 g APP which contained 1.0 mass % epoxide resin was obtained.

The values for viscosity and water-soluble constituents were determined as described in Example 1 and are indicated in Table 2.

EXAMPLE 4

The procedure was as in Example 3 but 200 ml butanol was used as the solvent for the epoxide resin/epoxide resin hardener-system.200 g APP which contained 1.0 mass % epoxide resin was obtained.

The values for viscosity and water-soluble constituents were determined as described in Example 1 and are indicated in Table 2.

EXAMPLE 5

200 g APP (EXOLIT 263) was placed in a heated laboratory kneader, heated to 100° C. and admixed within 15 minutes with a solution of 7.74 g BECKOPOX EP 140 and 2.26 g BECKOPOX EH 643 in 100 ml methanol. Next, the mixture was kneaded for 1 hour at 100°–110° C. with evaporation of the solvent and hardening of the epoxide resin. The yield was 204 g APP containing 4.9 mass % epoxide resin.

The values for viscosity and water-soluble constituents were determined as described in Example 1 and are indicated in Table 3.

EXAMPLE 6

The procedure was as in Example 5 but 3.87 g BECKOPOX EP 140 and 1.13 g BECKOPOX EH 643 were used. The yield was 200 g APP containing 2.5 mass % epoxide resin.

The values for viscosity and water-soluble constituents were determined as described in Example 1 and are indicated in Table 3.

EXAMPLE 7

The procedure was as in Example 5 but 1.94 g BECKOPOX EP 140 and 0.57 g BECKOPOX EH 643 dissolved in 50 ml methanol were used. The yield was 195 g APP containing 1.3 mass % epoxide resin.

The values for viscosity and water-soluble constituents were determined as described in Example 1 and are indicated in Table 3.

EXAMPLE 8

The procedure was as in Example 5 but 0.97 g BECKOPOX EP 140 and 0.29 g BECKOPOX EH 643 dissolved in 50 ml methanol were used. The yield was 195 g APP containing 0.65 mass % epoxide resin.

The values for viscosity and water-soluble constituents were determined as described in Example 1 and are indicated in Table 3.

EXAMPLE 9

The procedure was as in Example 5 but 1.55 g BECKOPOX EP 140 and 0.45 g BECKOPOX EH 643 dissolved in 50 ml methanol were used. The yield was 199 g APP containing 1.0 mass % epoxide resin.

The values for viscosity and water-soluble constituents were determined as described in Example 1 and are indicated in Table 3.

EXAMPLE 10

The procedure was as in Example 5 but EXOLIT 422 was used as APP together with 6.23 g BECKOPOX EP 140 and 3.77 g BECKOPOX EH 641 dissolved in 100 ml methanol. The yield was 206 g APP containing 4.8 mass % epoxide resin.

The values for viscosity and water-soluble constituents were determined as described in Example 1 and are indicated in Table 4.

EXAMPLE 11

The procedure was as in Example 10 but 3.12 g BECKOPOX EP 140 and 1.89 g BECKOPOX EH 641 dissolved in 50 ml methanol were used. The yield was 204 g APP containing 2.4 mass % epoxide resin.

The values for viscosity and water-soluble constituents were determined as described in Example 1 and are indicated in Table 4.

EXAMPLE 12

The procedure was as in Example 10 but 1.56 g BECKOPOX EP 140 and 0.95 g BECKOPOX EH 641 dissolved in 50 ml methanol were used. The yield was 203 g APP containing 1.2 mass % epoxide resin.

The values for viscosity and water-soluble constituents werde determined as described in Example 1 and are indicated in Table 4.

The data indicated in the following Tables show that the modifying agents of this invention permit the solubility behaviour of APP to be distinctly reduced. The same is true concerning the viscosity behaviour of APP in an aqueous medium, the viscosity behaviour of the polyol being less significantly improved.

It was a highly unexpected result however that it was possible for the solubility of even very scarcely soluble EXOLIT 422 to be further reduced by more than 50%.

The epoxide resins as modifying agents for APP compare favorably with the melamine and phenol resins used heretofore, as results from Tables 5 and 6 and the accompanying graph. More specifically, it is shown that APP having the epoxide resin applied to it has a solubility reduced by a maximum of 57% as compared with that of APP having a melamine resin applied thereto. The solubility values are even more drastically improved on comparing the epoxide resin with the phenol resin. The effects produced are diagrammatically represented in the accompanying graph, in which A stands for the phenol resin, B for the melamine resin, and C for the epoxide resin.

TABLE 1

| Ex. Nr. | Epoxide Resin Grade | Concentr. mass % | Viscosity (mPa · s) at 25° C. $H_2O$ | Change (%) | Polyol | Change (%) | Water-soluble constituents Mass % | Change (%) |
|---|---|---|---|---|---|---|---|---|
| 1 | EP 128/ VEH 2130 | 3.5 | 180 | −10 | 63 000 | −10 | 16 | −11 |
| 2 | VEP 22/ VEH 2130 | 3.6 | 152 | −24 | 61 000 | −13 | 15 | −17 |
| Comparative specimen (EXOLIT 263) | | — | 200 | — | 70 000 | — | 18 | — |

TABLE 2

| Ex. Nr. | Epoxide Resin Grade | Concentr. mass % | Viscosity (mPa · s) at 25° C. | | | | Water-soluble constituents | |
|---|---|---|---|---|---|---|---|---|
| | | | H$_2$O | Change (%) | Polyol | Change (%) | Mass % | Change (%) |
| 3 | EP140/ EH 643 | 1.0 | 144 | −37 | 52 000 | −24 | 15 | −17 |
| 4 | EP 140/ EH 643 | 1.0 | 140 | −39 | 50 000 | −26 | 11 | −39 |
| Comparative specimen (EXOLIT 263) | | — | 228 | — | 68 000 | — | 18 | — |

TABLE 3

| Ex. Nr. | Epoxide Resin Grade | Concentr. mass % | Viscosity (mPa · s) at 25° C. | | | | Water-soluble constituents | |
|---|---|---|---|---|---|---|---|---|
| | | | H$_2$O | Change (%) | Polyol | Change (%) | Mass % | Change (%) |
| 5 | EP 140/ EH 643 | 4.9 | 17 | −93 | 68 000 | ±0 | 4.4 | −74 |
| 6 | same | 2.5 | 21 | −91 | 62 000 | −9 | 5.2 | −71 |
| 7 | same | 1.3 | 48 | −79 | 61 000 | −10 | 7.0 | −61 |
| 8 | same | 0.65 | 110 | −52 | 57 000 | −16 | 12 | −33 |
| 9 | EP 140/ EH 643 | 1.0 | 50 | −78 | 53 000 | −22 | 9.0 | −50 |
| Comparative specimen (EXOLIT 263) | | — | 228 | — | 68 000 | — | 18 | — |

TABLE 4

| Ex. Nr. | Epoxide Resin Grade | Concentr. mass % | Viscosity (mPa · s) at 25° C. | | | | Water-soluble constituents | |
|---|---|---|---|---|---|---|---|---|
| | | | H$_2$O | Change (%) | Polyol | Change (%) | Mass % | Change (%) |
| 10 | EP 140/ EH 641 | 4.8 | 19 | −79 | 44 000 | ±0 | 2.7 | −67 |
| 11 | same | 2.4 | 26 | −72 | 42 000 | −5 | 3.7 | −55 |
| 12 | same | 1.2 | 34 | −63 | 38 000 | −14 | 4.2 | −49 |
| Comparative specimen (EXOLIT 422) | | — | 92 | — | 44 000 | — | 8.2 | — |

TABLE 5

| Quantity of resin in mass % | Reduction of water soluble constituents in mass % | | Improvement Rate in % |
|---|---|---|---|
| | Melamine Resin | Epoxide Resin | |
| 2.5 | 45 | 71 | 57 |
| 4.9 | 57 | 74 | 30 |

TABLE 6

| Quantity of resin in mass % | Reduction of water soluble constituents in mass % | | Improvement Rate in % |
|---|---|---|---|
| | Melamine Resin | Epoxide Resin | |
| 1.3 | 18 | 61 | 239 |
| 2.5 | 18 | 71 | 294 |
| 4.8 | 27 | 74 | 174 |

We claim:

1. Particulate agent, for flameproofing polyurethanes or polyurethane foam plastics, based on a free-flowing pulverulent ammoniumpolyphosphate of the general formula

in which n stands for a whole number with an average value of 20 to 800 and the ratio of m/n is about 1, and an epoxide resin with an epoxide equivalent weight of 170 to 220, the agent containing:

(a) 80 to 99.5 mass percent ammoniumpolyphosphate, and (b) 0.5 to 20 mass percent epoxide enveloping the individual ammoniumpolyphosphate particles.

2. Agent as claimed in claim 1, wherein the particles have a mean size of about 0.01 to 0.05 mm.

3. Agent as claimed in claim 1 or 2, wherein n stands for a whole number with an average value of 450 to 800.

4. Agent as claimed in claims 1 or 3, wherein the epoxide resin is used in a proportion of 1 to 5 mass %.

5. Agent as claimed in claims 1 or 4, wherein the epoxide resin is an alcohol-soluble, hardenable resin which is obtained by reacting a dihydric or polyhydric alcohol with epichlorhydrin or glycerol dichlorohydrin under alkaline conditions or, if desired, in the presence of an acid catalyst, and then treating it with an alkali.

6. Particulate agent for flameproofing polyurethanes or polyurethane foam plastics based on a free-flowing, pulverulent ammonium polyphosphate of the general formula

in which n stands for a whole number with an average value of 20 to 800 and the ratio of m/n is about 1, and an epoxide resin with an epoxide equivalent weight of 170 to 220, the agent containing:
(a) 80 to 99.5 mass percent ammonium polyphosphate, and
(b) 0.5 to 20 mass percent hardened epoxide enveloping the individual ammonium polyphosphate particles, and the agent being present in the polyurethane foam plastics in amounts from 5 to 25 mass percent.

* * * * *